Dec. 2, 1941.  F. G. TILLETT  2,264,779
APPARATUS FOR REPRODUCING CHARACTERS, DESIGNS, OR THE LIKE
Filed Feb. 25, 1939  4 Sheets-Sheet 1
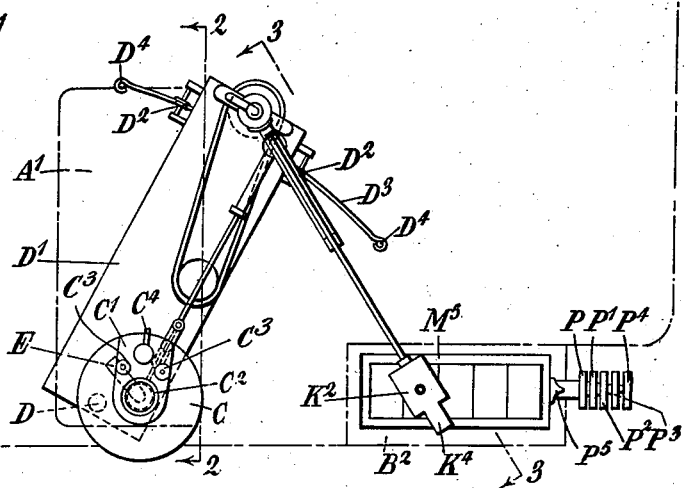
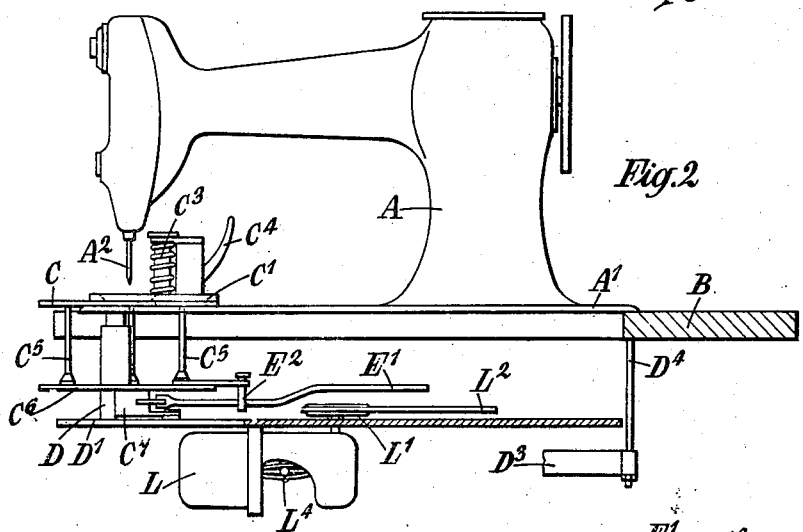
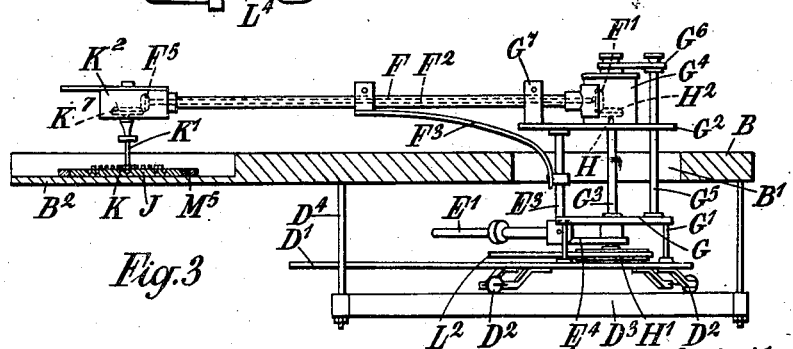
Inventor
Frederick G. Tillett,
By:- Smith, Michael & Gardiner,
Attorneys Dec. 2, 1941.    F. G. TILLETT    2,264,779
APPARATUS FOR REPRODUCING CHARACTERS, DESIGNS, OR THE LIKE
Filed Feb. 25, 1939    4 Sheets-Sheet 2
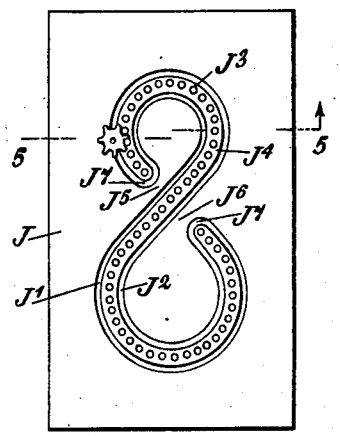
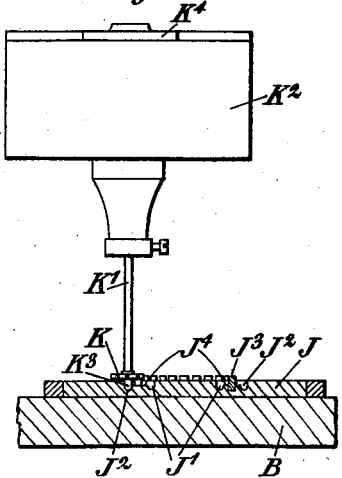
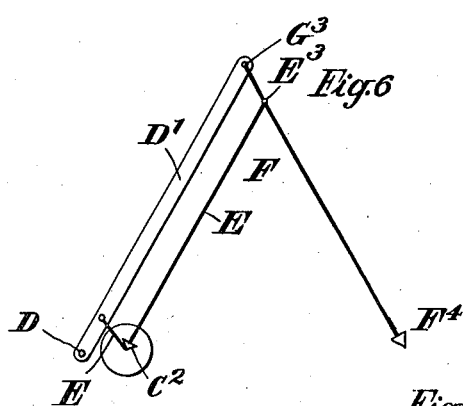
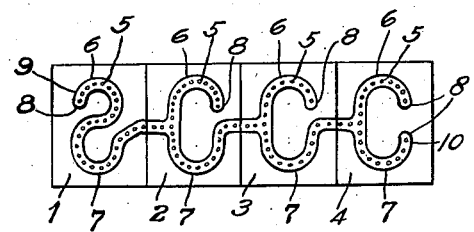
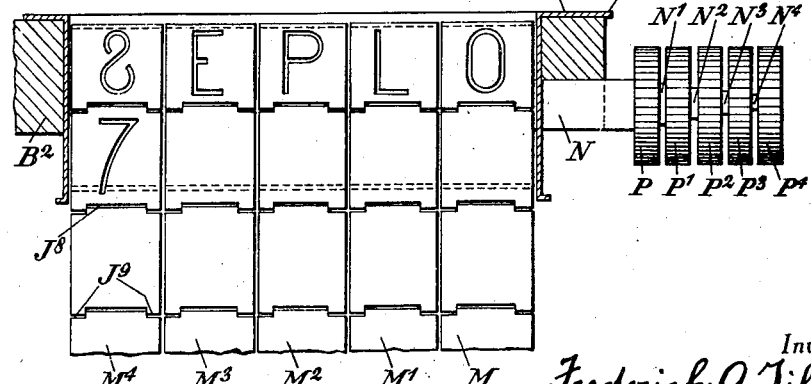
Inventor
Frederick G. Tillett,
by
Smith, Michael & Gardiner,
Attorneys

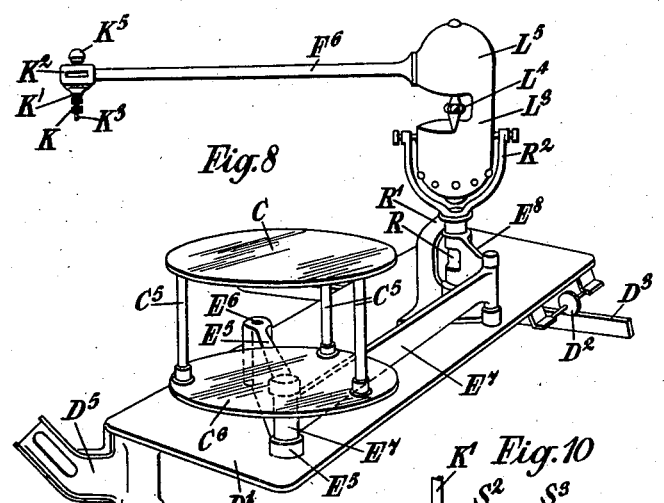
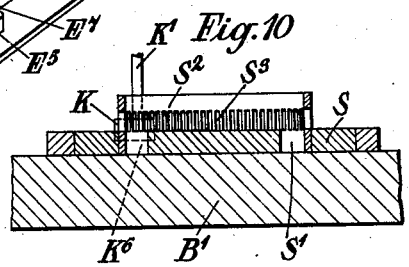
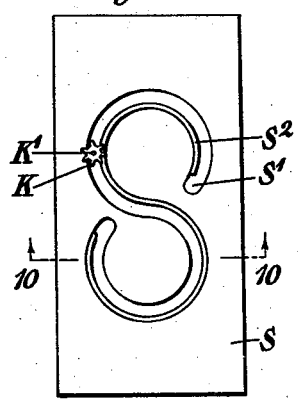
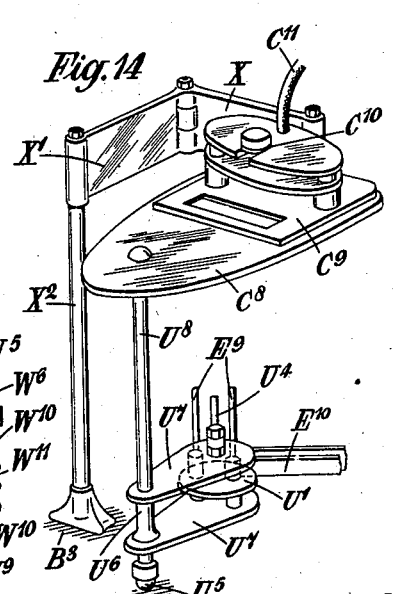
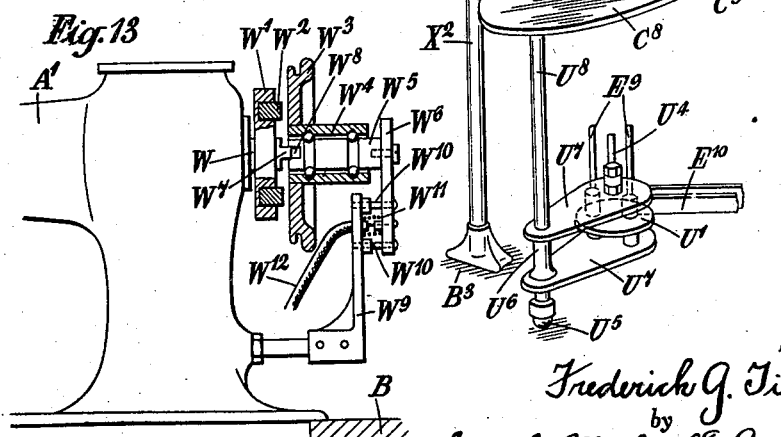

Dec. 2, 1941.    F. G. TILLETT    2,264,779
APPARATUS FOR REPRODUCING CHARACTERS, DESIGNS, OR THE LIKE
Filed Feb. 25, 1939    4 Sheets-Sheet 4
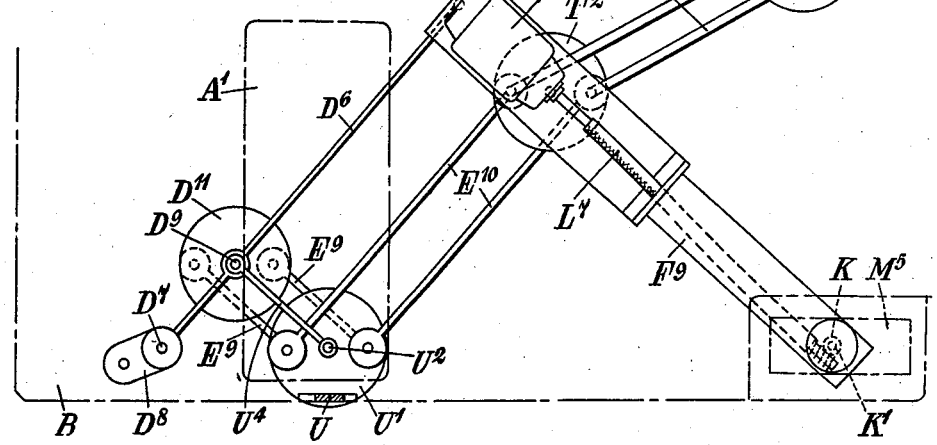
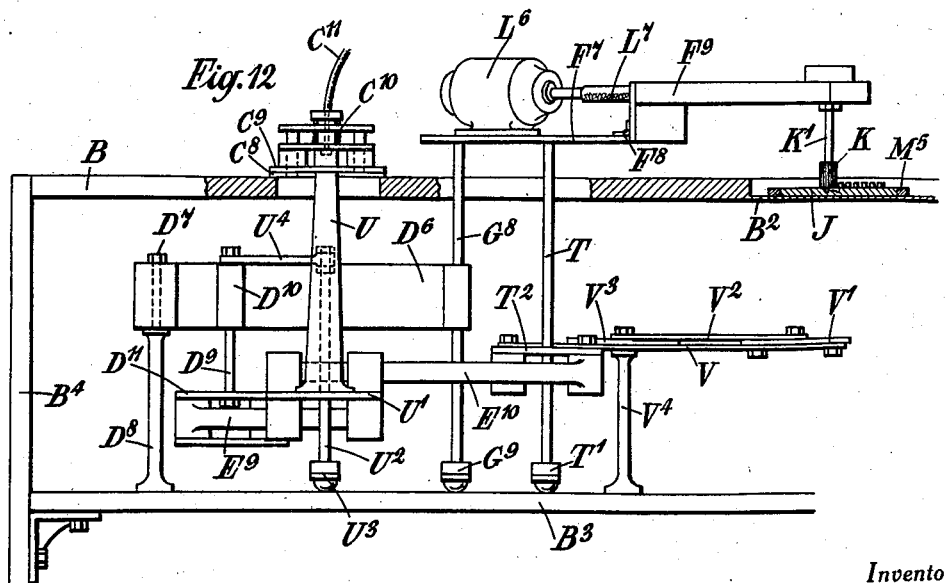
Inventor
Frederick G. Tillett,
by Smith, Michael & Gardiner,
Attorneys Patented Dec. 2, 1941

2,264,779

UNITED STATES PATENT OFFICE 2,264,779

APPARATUS FOR REPRODUCING CHARACTERS, DESIGNS, OR THE LIKE

Frederick George Tillett, London, England; Frederick Reginald Tillett, Stanley Horace Tillett, Violet Ethel Tillett, and Dorothy Mabel Tillett, executors of said Frederick George Tillett, deceased Application February 25, 1939, Serial No. 258,563
In Great Britain August 31, 1938

14 Claims. (Cl. 112—102)

This invention relates to apparatus for reproducing characters, designs or the like and whilst not limited thereto is particularly applicable to apparatus for use with embroidery or marking sewing machines to enable a desired design, character or group of characters to be stitched into a piece of material or an article of clothing.

Various forms of apparatus for reproducing characters, designs and the like have been proposed in which the reproducing device is actuated by a member which is moved by hand over the character or design to be reproduced. Thus such a machine for use in marking articles for laundry or similar purposes is described in the specification of United States Patent No. 2,007,819 in the name of the present applicant. In such apparatus, however, the accuracy of reproduction depends, at least to some degree, on the skill and care of the operator in ensuring that the controlling member is properly moved or traced over the character or design to be reproduced. The main object of the present invention is to provide improved apparatus in which the desired reproduction is effected automatically following initiation of the operation of the apparatus and the accuracy of reproduction is not affected by the degree of care exercised by the operator.

The improved reproducing apparatus according to this invention comprises a toothed rack shaped to the form of the character or other design to be reproduced, a rotatable pinion engaging with the rack and carried on a movable control rod, co-operating guide means associated with the rack and the pinion whereby as the pinion is rotated, it moves over the rack in a course determined by the shape of the rack thereby causing corresponding movement of the control rod, and mechanism for so connecting the control rod to a reproducing device that movements representative of the course followed by the pinion are imparted to the reproducing device. Preferably the control rod carrying the pinion constitutes a member of a pantograph link system connecting the pinion to the reproducing device.

In a convenient arrangement the rack is of the pin tooth or comb type having an adjacent guide slot of corresponding form which is engaged by a member carried by the pinion, or the control rod carrying the pinion, so that the pinion is maintained in engagement with the rack. The pinion may be mounted on a spindle which is perpendicular to a base plate on which the rack is mounted with its teeth projecting upwardly from such base plate, the end of the spindle preferably projecting beyond the pinion to engage in a guide slot beside the rack. Preferably the pinion is driven by an electric motor carried by or constituting part of the mechanism, such as a pantograph link system, for connecting the control rod to the reproducing device.

When the apparatus is used for marking laundry articles, for embroidery or for sewing any other desired design on an article the reproducing device comprises a clamping frame carrying the article to be marked and movable under the control of the pinion beneath the reciprocating needle of a sewing machine. Alternatively the sewing machine may be carried on the movable frame operated by the control rod whilst the work is held beneath the needle in a fixed clamp.

Three convenient constructions of reproducing apparatus according to the invention will now be described, by way of example, as applied to a sewing machine for marking articles or for embroidery, with reference to the accompanying drawings, in which—

Figure 1 is a plan view of one construction with the sewing machine parts omitted in order to simplify the figure, Figures 2 and 3 are respectively sections on the lines 2—2 of Figure 1, and 3—3 of Figure 1, these two sections being on the same scale as one another but on a larger scale than Figure 1, Figure 4 is a plan, on an enlarged scale, of a character to be reproduced, Figure 5 is a section on the line 5—5 of Figure 4, Figure 5a is a plan of a group or assembly of character plates of the type shown in Figure 4 and illustrating a means for producing a plurality of characters on a piece of material, on an article of clothing or the like.

Figure 6 is a line diagram of the lever system employed in the apparatus shown in Figures 1 to 3, Figure 7 is an end elevation, on an enlarged scale, of part of the apparatus shown in Figures 1 to 3, Figure 8 is a perspective view of the second construction, Figure 9 is a plan similar to Figure 4 of an alternative form of character for reproduction, Figure 10 is a section on the line 10—10 of Figure 9 on an enlarged scale, Figure 11 is a plan of the lever system employed in the third construction, Figure 12 is an end elevation of the third construction, and, Figures 13 and 14 are views, on an enlarged scale, of parts of apparatus which may be embodied in the third construction.

In the construction shown in Figures 1 to 7, a sewing machine A (Figure 2) with a reciprocating needle $A^2$ has the usual base plate $A^1$ by means of which it is secured to the top B of a work table which is indicated in dot and dash lines in Figure 1 and parts of which are shown in section in Figures 2, 3, 5 and 7. The needle $A^2$ co-operates with a movable clamping frame for holding the material to be marked or embroidered, hereinafter referred to as the work, this frame comprising, as most clearly shown in Figure 1, a flat upper plate C the undersurface of which rests on the machine base plate $A^1$ and a clamping plate $C^1$ for holding the work in position on the plate C. The plate C has a central aperture in alignment with an opening $C^2$ in the clamping plate $C^1$ so that the needle $A^2$ can operate freely on the part of the work exposed through the opening $C^2$. The clamping plate $C^1$ is normally pressed by compression springs $C^3$ towards the plate C so as to grip the work firmly but can be raised by a lever $C^4$ against the action of the springs to permit the insertion and removal of the work. The upper plate C is rigidly connected by rods $C^5$ extending through apertures in the machine base plate $A^1$ to a lower plate $C^6$ disposed below the top B of the work table, the lower plate being connected, in a manner which will be described below, to the operating mechanism for effecting movement of the frame relatively to the needle so that the desired character or design is sewn into the part of the work in the opening $C^2$. The apertures in the base plate $A^1$ through which the rods pass must be sufficiently large to permit the maximum movement of the clamping frame which is likely to be required during operation.

Pivoted below the table top B on a fixed rod D projecting downwardly from the underside of the base plate $A^1$ is a horizontal rectangular platform $D^1$ carrying the link and driving mechanism of the reproducing apparatus, the free end of the platform being provided with grooved wheels $D^2$ resting on a supporting rail $D^3$ carried on rods $D^4$ projecting downwardly from the table top B. The supporting rail $D^3$ is curved in an arc having its centre at the pivot D so that the platform $D^1$ can readily move about the pivot and yet is adequately supported.

The underside of the lower plate $C^6$ is provided with a central boss $C^7$ which is connected by a link E (Figure 1) to a point on the platform $D^1$ between the pivot D and the free end of the platform. Also pivoted to the boss $C^7$ is an operating arm $E^1$ which extends, through a supporting guide $E^2$ carried by the plate $C^6$, towards the free end of the platform.

The free end of the platform carries a supporting stand for a horizontal pivoted control rod F which extends over the top of the table and carries at its free end a device, which will be more fully described below, for moving over the character or design to be reproduced. The supporting stand comprises a lower horizontal plate G disposed below the table top B and rigidly attached to the platform by legs $G^1$ and an upper horizontal plate $G^2$ disposed above the table top and connected to the lower plate G by a vertical tube $G^3$ which passes freely through an aperture $B^1$ in the table top. A vertical spindle H having a driving pulley $H^1$ below the lower plate extends upwardly through the tube $G^3$ and carries at its upper end a bevel pinion $H^2$ which meshes with a bevel pinion $F^1$ on the end of a spindle $F^2$ passing through a bore in the control rod F. The end of the rod F is rigidly connected to a casing $G^4$ carried on the plate $G^2$ and enclosing the bevel pinions $H^2$ and $F^1$. The plate $G^2$ and the gear casing $G^4$ carried thereby are thus free to rotate about the axis of the tube $G^3$ which thus constitutes the pivotal axis of the control rod F. A steadying rod $G^5$ projecting upwardly from the lower plate G is connected by a pivoted link $G^6$ to the centre of the top of the gear casing so that the whole structure is rigidly maintained in position and yet the control rod F can be moved about its pivot. The end of the arm $E^1$ is pivoted to a rod $E^3$ extending upwardly through the opening $B^1$ in the table top and connected to the underside of the top plate $G^2$. The plate $G^2$ also carries a guide lug $G^7$ having an aperture through which the control rod F passes so that movements of the rod F about its pivot cause corresponding movements of the plate $G^2$, such movements being communicated to the arm $E^1$ by the rod $E^3$ which is connected to the arm F between the pivot and the free end thereof. The end of the arm $E^1$ is supported by a link $E^4$ between the arm and the pivotal axis of the control rod F whilst the control rod is supported by means of a springy bracket $F^3$ in such a manner that the free end thereof has a limited degree of vertical movement.

The complete system of arms and links between the movable frame carrying the work and the free end of the control rod F is most clearly shown in the line diagram of Figure 6 in which only the relative positions of the members and their pivots are indicated, the members being given the same reference letters as are used for the corresponding parts in Figures 1 to 3 with the arrow head $F^4$ for indicating the device on the free end of the control rod F and the arrow head $C^2$ the opening in the clamping frame containing the work. As will be apparent from Figure 6 the whole system constitutes a pantograph mechanism by means of which the opening $C^2$ follows any horizontal movements of the device $F^4$ but on a reduced scale which is determined by the relative dimensions of the various members. Thus, for example, with the members having the relative dimensions indicated in Figure 6 the size of a character or design which is sewn into the work is about one-twentieth of the size of the original character or design which is traced over by the device $F^4$.

In order that the free end of the rod F may automatically travel over the design or character to be reproduced, the outline thereof is in the form of a toothed rack and the device carried on the end of the control rod F comprises a toothed pinion driven by the shaft $F^2$. Thus, referring to Figures 4 and 5, which show, by way of example, a character in the form of the figure eight, the outline of the figure is formed by two parallel grooves $J^1$ and $J^2$ in a flat metal plate J, for example of brass. The rack is constituted by a series of upstanding teeth $J^3$ disposed in the space between the two parallel grooves so that they also follow the outline of the figure. The rack teeth may, as shown in Figure 5, comprise a series of evenly spaced pins of circular cross-section and of steel or other relatively hard metal firmly fixed along the centre line of the part $J^4$ between the grooves $J^1$ and $J^2$ so as to project vertically upwards a short distance, for example, about ⅛ inch, above the surface of the plate. Alternatively a steel blade having teeth, after the manner of the teeth of a saw but preferably of circular cross-section, may be suitably bent to shape and wedged or otherwise fixed in a continuous groove in the part $J^4$. As will be appreciated, however, the toothed rack may be formed in any other convenient manner. For example, the whole plate bearing the rack and adjacent grooves can be die-cast of any suitable metal so that the rack is formed integral with the plate, the teeth either being formed during casting or by a subsequent machining process. In order that there may be a continuous groove surrounding the character or design the rack is so arranged that it has two ends, the positions of which will depend on the form of the design or character and are indicated at $J^5$ and $J^6$ in the case of the figure eight shown in Figure 4, the adjacent ends of the grooves $J^1$ and $J^2$ being joined by semi-circular grooves $J^7$ extending around the ends of the rack.

Co-operating with the rack is a pinion K carried on a vertical spindle $K^1$ projecting downwardly from a gear casing $K^2$ mounted on the free end of the control rod F. The spindle $K^1$ is connected by bevel pinions $K^7$ and $F^5$ (Figure 3) or by a suitable worm drive to the spindle $F^2$ passing through the bore in the rod F so that the spindle $K^1$ carrying the pinion K is driven by an electric motor L (Figure 2) which is mounted on the underside of the platform $D^1$ and drives a pulley $L^1$ which is coupled by a belt $L^2$ to the driving pulley $H^1$ for the spindle $G^3$. The pinion K is mounted a short distance, for example, about ⅛ inch, above the lower end $K^3$ of the spindle $K^1$, this lower end being rounded so as to fit into the groove $J^1$ or $J^2$ at the side of the rack. The dimensions of the teeth of the pinion K and the size and spacing of the teeth $J^3$ of the rack are such that when the end $K^3$ engages in a groove the teeth of the pinion mesh with those of the rack. The gear casing $K^2$ is conveniently provided with a bar shaped handle $K^4$ so that the rod F can readily be raised to lift the end $K^3$ of the spindle $K^1$ from a groove of one character or design to a groove of another.

When it is desired to operate the apparatus, the work is inserted in the clamping frame and the desired character or design is fixed on the top of the table B in a suitable position below the free end of the control rod F as indicated at $B^2$ in Figure 1. In the case of a series of letters and/or figures, the end $K^3$ of the spindle K is then inserted in a groove of the first letter or figure and the motor L and the sewing machine motor started either simultaneously or, if desired, the sewing machine motor may be started after the motor L. In the case, for example, of the character shown in Figure 4, the pinion K, if it starts in the position shown in this figure, and rotates in a clockwise direction as viewed from above, will travel around the rack, the end $K^3$ of the spindle $K^1$ being guided first by the groove $J^2$ and then around the curved part $J^7$ at the end $J^6$ into the groove $J^1$ and back to the starting position. It will readily be appreciated that the co-operation between the rack and the pinion ensure positive movement of the free end of the rod F around the prescribed path at a speed determined by the speed of the motor L which is preferably provided with a governor or is otherwise so controlled that its speed is suitably co-related to that of the sewing machine. An important advantage of the improved apparatus is that owing to the positive movement referred to above, very high sewing speeds can be used, for example of the order of 800 or 900 stitches per minute.

By means of the pantograph mechanism the path traced by the spindle $K^1$ as it follows the outline of the character will be reproduced on a smaller scale by the movements of the work clamping frame so that the pattern sewn in the work corresponds to the outline followed by the spindle $K^1$. In practice it is found that letters or figures having a height of about two to two-and-a-half inches can be readily made and are suitable for marking the work with letters or figures of about ⅛ inch high, although it will be appreciated that, without altering the size of the original characters, the size of the reproduced characters can be modified to any desired extent by adjustment of the pantograph. When one letter or figure has been sewn in the work, the end of the control rod F is lifted and the end $K^3$ of the spindle $K^1$ inserted in a groove of the next letter or figure.

Where it is necessary, as in marking laundry, to provide for varying combinations of letters and figures, the arrangement may be such that the required characters, for example, five characters can be selected and held in a suitable frame and then when another combination is required the appropriate alteration made. Since, however, frequent changes are often required in practice, it is preferable to provide means mounted on the work table whereby the operator can readily bring into the operative position any desired combination of characters.

One convenient arrangement is shown in Figure 7 in which there are arranged side by side five endless bands M—$M^4$ each built up of the appropriate letters and figures, for example the letters A to Z and the figures 1 to 9 arranged end to end. Each character comprises a plate J similar to the plate shown in Figure 4 but provided at its ends with hinge members $J^8$ and $J^9$ so that the endless bands can be built up in a simple manner. Mounted side by side in suitable bearings (not shown) below the work table are five hexagonal wheels or drums over which the several bands pass, the arrangement being such that in any of the positions of the bands five characters are exposed side by side in a frame $M^5$ (Figure 1) below the free end of the control rod F. The bands pass downwardly over suitable pulleys or the equivalent arranged below the work table in a position such that they will not be in the way of the operator. In order that the desired characters can readily be selected to appear in the frame $M^5$ the hexagonal drums are mounted on coaxial tubular shafts which are provided with individual operating wheels. Thus as shown in Figure 7 the drum for the band M is carried on the outer tubular shaft N operated by the wheel P, that for the band $M^1$ on the next shaft $N^1$ operated by the wheel $P^1$ and so on, the inside shaft $N^4$ for operating the band $M^4$ preferably being solid. The operating wheels P—$P^4$ are, as indicated by the transverse lines thereon, provided with facets each marked with the letter or figure which is exposed in the frame $M^5$ when the facet bearing such letter or figure is opposite to an indicating arrow $P^5$. The desired combination of letters and/or figures can thus readily be set up in the frame $M^5$. It is to be understood that, if desired, any other convenient arrangement can be employed.

In the form of character shown in Figures 4 and 5 a continuous groove is provided completely surrounding the rack so that the character can be traced over several times in succession as may be desirable in order to avoid any spaces in the character sewn in the work due to the sewing machine missing a stitch, or to obtain a sewn reproduction which, since it comprises several superimposed rows of stitches, is very strong. If desired, however, there need only be one groove associated with the rack conforming with the outline of the character and the rack can be arranged to extend from a definite point on the left hand edge of the plate carrying the character to a corresponding point on the right hand edge so that the racks formed by the several characters in a row are continuous and the pinion will automatically traverse over the entire group of characters without manual manipulation. In order then to allow the characters to be traversed automatically two or more times should this be desired or necessary, a rack and groove may be provided around the edge of the frame M⁵ so that the pinion will travel off the last character on to the frame, back to the left hand end of the frame and thence on to the first character again. Alternatively the rack of each character may have grooves on each side of it so that the pinion completes a continuous movement around such rack, the rack with its grooves being arranged, however, so that it starts on the left hand edge of the plate and finishes at the right hand edge.

In Fig. 5a of the accompanying drawings there is illustrated a group of plates 1, 2, 3 and 4, each containing an appropriate character of the type illustrated in Fig. 4, i. e., a character having a center line rack 5 constituted by a series of spaced upstanding teeth disposed in the space between two grooves 6 and 7. In this assembly of plates, the line rack 5 and grooves 6 and 7 of the two end plates 1 and 4 extend from the characters thereon to the right edge and to the left edge, respectively, of the said end plates, whereas the line rack and grooves of the two intermediate plates 2 and 3 extend from the characters thereon to the right edge and to the left edge of the said intermediate plates. The portions of the line rack and grooves which extend from the characters to one or both edges of the plates terminate at a uniform position along the edge or edges of the several plates, so that a plurality of the plates may be assembled as shown in Fig. 5a, wherein the line rack and grooves are continuous between the several plates of the group or assembly. As was the case in that form of my invention illustrated in Fig. 4, the free ends of the grooves 6 and 7, i. e., the ends which are not extended to a side edge of the plate, are joined by semi-circular grooves 8 extending around an adjacent end of the line rack 5. It will thus be seen that the grooves 6 and 7 and the connecting grooves 8 form an endless, continuous track for the end K³ of the pinion spindle K¹, which track extends from the end 9 of the character on plate 1, along the line rack 5 of the characters on the plates 1, 2, 3 and 4, and then from the free end 10 of the character on plate 4, along the line rack 5 of the character on the plates 4, 3, 2 and 1 to the end 9 of the character on plate 1. When the end K³ of the spindle K¹ is inserted at the point 9 on the plate 1 and the pinion K is rotated in a clockwise direction as viewed in Fig. 5a, it will progressively travel along the character on plate 1, across the extension between the said character and the character on plate 2, along the character on plate 2, across the extension between the said character and the character on plate 3, along the character on plate 3, across the extension between the said character and the character on plate 4, and along the character on plate 4 to the point 10. Continued clockwise rotation of the pinion K will cause the spindle K¹ to traverse the semi-circular groove 8 at the lower end of the character on plate 4 and to then move along the lower half of the character on plate 4, across the extension between said character and the character on plate 3, along the lower half of the character on plate 3, across the extension between said character and the character on plate 2, along the lower half of the character on plate 2, across the extension between said character and the character on plate 1, and then completely around the character on plate 1 to the starting point 9. The word or group of characters thus reproduced will have a centre line running through it but in many instances this is an advantage as it provides distinctive marking.

The modified arrangement shown in Figure 8 in which, in order to simplify the figure, the work table and the sewing machine are omitted, is generally similar to that shown in Figures 1 to 3 and described above but embodies a somewhat simpler mechanical construction for the pantograph mechanism and the drive for the pinion co-operating with the rack. This arrangement, in which parts corresponding to parts of the construction shown in Figures 1 to 3 are given the same reference letters with different index numbers when such parts are not of similar form, is also provided with a platform D¹ pivoted below the work table (not shown) on a fixed arm D⁵ and having its free end supported by means of rollers D² on an arcuate rail D³ suspended from the underside of the table. The work frame comprising upper and lower plates C and C⁶ connected by vertical rods C⁵, is supported by a link E⁵ pivoted at E⁶ to the platform with its underside resting thereon so that the work frame is firmly supported by the platform. The end of the link E⁵ pivoted to the work frame also has pivoted to it one end of an operating arm E⁷ having its other end pivoted to a crank E⁸ on a vertical spindle R rotatably mounted in a supporting stand R¹ fixed to the upper surface of the platform D¹ near the free end thereof. Rigidly fixed to the upper end of the shaft R, which extends above the work table, is a semicircular support R² for an electric motor L³ for driving the pinion at the end of the control arm. The motor L³ has a governor L⁴ embodied in its driving shaft and a gear casing L⁵ containing a bevel or other geared drive for a spindle (corresponding to the spindle F²) which extends through a bore in the horizontal control rod F⁶. The rod F⁶ is rigidly fixed to the casing L⁵ and has at its free end the gear casing K² and the vertical spindle K¹ carrying the pinion K as in the arrangement shown in Figures 1 to 3. The gear casing K² may be provided with a hand knob K⁵ on its upper surface.

Since the motor L³ and the arm E⁷ are both rigidly connected to the vertical shaft R, this arrangement constitutes a pantograph mechanism, similar to that shown diagrammatically in Figure 6, whereby movements of the pinion K in a horizontal plane cause corresponding movements on a reduced scale of the work frame C, C⁶. This arrangement is, however, considerably simplified, as compared with that shown in Figures 1 to 3, mainly by so mounting the driving motor for the pinion K that its casing forms a link in the pantograph mechanism.

If desired, a rack of comb form such as is shown in Figures 9 and 10, may be used instead of the pin-tooth type rack shown in Figures 4 and 5. With the arrangement shown in Figures 9 and 10, a slot $S^1$ having an outline corresponding to the desired character, is formed in a metal plate S. The rack comprises a metal strip $S^2$, for example, of spring metal, having equally spaced comb-like slots $S^3$ cut therein. The strip is mounted edgewise in the slot $S^1$ and is soldered or otherwise fixed to one edge of the slot. As will be clearly seen from Figure 10, the strip $S^2$ constitutes a rack having teeth formed by the metal bars between the slots $S^3$, this rack being engaged by the pinion K which has formed integral therewith a boss $K^6$ which engages in the guide slot $S^1$. The strip $S^2$ is somewhat shorter than the total length of the slot $S^1$ so as to provide at the ends of the slot spaces, clear of the rack, where the pinion can be inserted since this form of rack has the advantage that the pinion can only be inserted in or removed from the character at the beginning or the end thereof as the ends of the rack teeth are closed by the edge of the strip $S^2$. Alternatively the pinion can, if desired be arranged with its axis horizontal so that its teeth directly engage with corresponding teeth of the rack over which the pinion therefore moves, the pinion being driven by another pinion meshing therewith and directly mounted on the end of the shaft passing through the bore in or constituting the control rod whilst it is guided in any suitable manner, for example, by a pin engaging in a groove beside the rack. If desired, any suitable means other than the grooves described above may be used for guiding the pinion, however it is mounted, so that the teeth are maintained in mesh with the teeth of the rack. For example the rack may be arranged at the bottom of a trough or groove the side walls of which are engaged by a guide member carried by the pinion support.

In the arrangements shown in Figures 1 to 3 and in Figure 8, there is slight distortion of the reproduced characters owing to the very simple nature of the pantograph mechanism employed and thus it is desirable for the character or design to be traversed by the rotatable pinion to be slightly distorted if an undistorted reproduction is desired. In the construction shown in Figures 11 to 15, this disadvantage is avoided and, in addition, the complete automatic control of the machine is attained.

Thus, referring to Figures 11 and 12, each link of the pantograph mechanism, with the exception of the link corresponding to the movable platform $D^1$ of the arrangements described above, consists of a pair of parallel links and in addition the pivot $E^3$ (Figure 6) is guided by a further link system.

In this arrangement a main arm $D^6$, which corresponds to the platform $D^1$ of the arrangements described above, has one end mounted on a fixed pivot $D^7$ at the upper end of a post $D^8$ rigidly fixed to a platform $B^3$ firmly supported on the frame $B^4$ carrying the work table B so that such platform is below and parallel to the work table. Extending through roller bearings carried by the other end of the arm $D^6$ is a rod $G^8$ the upper end of which projects above the work table B whilst the lower end carries a ball bearing castor $G^9$ which rests on the platform $B^3$. The upper end of the rod $G^8$ carries the control rod for the rotatable pinion engaging with the character or design to be reproduced. This control rod comprises a flat plate $F^7$ carrying an electric motor $L^6$ for driving the pinion and, connected by a hinge $F^8$ to the end of the plate $F^7$, a box-like arm $F^9$ carrying at its free end the downwardly projecting shaft $K^1$ provided on its lower end with the pinion K, the arrangement of this pinion being generally similar to that shown in Figure 5. The hinge $F^8$ enables the arm $F^9$ to be tilted to lower the pinion K on to a character and to raise it therefrom without movement of the plate $F^7$. The shaft $K^1$ is driven by a worm gear on a flexible shaft $L^7$ extending through the box-like arm $F^9$ and directly connected to the shaft of the motor $L^6$ which preferably has a reducing gear and governor device mounted within its casing. The second pivotal axis of the control rod, corresponding to the pivot $E^3$ shown in Figure 6 comprises a vertical rod T projecting downwardly through an aperture in the top of the table, the rod T having at its lower end a ball bearing castor $T^1$ which rests on the platform $B^3$. The rod T passes through the centre of a circular disc $T^2$.

A clamping frame for holding the work to be marked or embroidered and consisting of a lower plate $C^8$ and a clamping plate $C^9$ rests on the upper surface of the work table B. The plate $C^9$ has a rectangular aperture through which the needle of the sewing machine $A^1$, indicated in dot and dash lines in Figure 11, passes into the work. The plate $C^9$ is normally pressed on the plate $C^8$ by means of a spring $C^{10}$ but can be raised therefrom to permit insertion and removal of the work by means of a control cable $C^{11}$, preferably of the Bowden type. Projecting downwardly from the front edge of the plate $C^8$, as viewed in Figure 12, is a pillar U secured at its lower end to a flat circular disc $U^1$. Passing through the centre of the disc $U^1$ is a vertical rod $U^2$ having at its lower end a roller castor $U^3$ resting on the platform $B^3$ while its upper end is connected by a steadying link $U^4$ to a pivot pin $D^9$ passing through roller bearings mounted in a tubular bore $D^{10}$ in the arm $D^6$ near to the fixed pivotal axis $D^7$. The lower end of the pivot pin $D^9$ is secured to the centre of a flat circular disc $D^{11}$ which is in the same horizontal plane as the disc $U^1$. The discs $D^{11}$ and $U^1$ are coupled by a pair of links $E^9$ which correspond to to the link E of the diagram shown in Figure 6. The links $E^9$ are arranged so that they are respectively attached, preferably by ball or roller bearings, to diametrically opposite points on the undersides of the two discs. They remain parallel to one another in all positions of the discs. The disc $U^1$ is also coupled to the disc $T^2$ by a pair of parallel links $E^{10}$, which correspond to the link $E^1$ of the diagram shown in Figure 6, the links $E^{10}$ also being connected between diametrically opposite points of the two discs so that they remain parallel during relative movement thereof. The links $E^{10}$ are attached to the upper surface of the disc $U^1$ by the same pivot pins as are used for the links $E^9$.

The pantograph mechanism as thus far described is basically similar to that shown in Figure 6 except that there are a pair of links between the work frame and the main arm and also between the work frame and the control rod carrying the pinion K. In addition, however, the disc $T^2$ has connected to the same pivot pins as are used for the links $E^{10}$, a pair of links V connected to diametrically opposite points of a disc V¹ which is in turn connected by a pair of links V² to a further disc V³ pivoted at the upper end of a vertical pillar V⁴ fixed to the platform B³. The links V² are pivoted to diametrically opposite points of the disc V³ and also to diametrically opposite points of the disc V¹ but the points on the disc V¹ to which the links V² are connected, lie on a diameter which is at right angles to the diameter passing through the pivots of the links V.

As is clearly shown in Figure 11, the complete pantograph system is such that, as in the other arrangements described above, the disc U¹ carrying the clamping frame follows the movements of the control rod carrying the pinion K but, in addition, the parallel sets of links E⁹, E¹⁰, V and V² control the movement of the disc U¹ relatively to the movement of the control rod in such a manner as to ensure that there is no distortion and the horizontal movements of the disc U¹ correspond exactly in direction and magnitude, although to a different scale, with the horizontal movements of the pinion K. The pairs of parallel links thus serve to correct the pantograph mechanism in such a manner as to compensate for the fact that the pivotal points of the discs U¹ and D¹ and the axis of the pinion K do not lie in the same straight line during all movements of the mechanism.

A further advantage of the arrangement shown in Figures 11 and 12 is that the whole of the weight of the pantograph mechanism and of the control rod with its driving motor is supported, by means of the castors G⁹, T¹ and U³ on the rigid platform B³ which may be provided with a metal plate on its upper surface which can easily be adequately lubricated. As will be appreciated this supporting arrangement can more readily be constructed and aligned than the pivoted platform of the two arrangements described above. Furthermore, adequate space can be provided between the table B and the platform B³ for the link system so that the various links can be of robust construction and can be connected to the appropriate discs or other pivot pins by means of ball or roller bearings so that friction is reduced to a minimum.

In order to facilitate control of the complete apparatus, the controls for the various parts of the apparatus are preferably arranged to be actuated by a single pedal (not shown) so that apart from operating this pedal, the operator need only control the positioning of the pinion K on the character or design to be reproduced. Accordingly, the sewing machine A¹ is provided, as shown in Figure 13, with a clutch for rendering it operative. Thus, the main machine shaft W has keyed thereon a disc W¹ having projecting from its outer surface the ends of corks W² held in recesses in the disc. A flywheel W³ is fixed on a sleeve W⁴ carried on thrust ball bearings (indicated diagrammatically in Figure 13) on a spindle W⁵ rigidly supported on a plate W⁶ so that the spindle W⁵ is in alignment with the shaft W. The flywheel W³ is provided with a driving pulley driven by an electric motor or from a suitable main line-shaft for driving a number of machines arranged in line and the plate W⁶ is movable towards and away from the disc W¹, in a manner which will be described below, to bring the surface of the flywheel into contact with, or to move it away from, the ends of the corks W². The arrangement thus constitutes a clutch by means of which the machine can, when desired, be driven by the flywheel W³, alignment between the shaft W and the spindle W⁵ being maintained by a boss W⁷ on the end of the shaft which engages in a central recess W⁸ in the end of the spindle even when the clutch is in its disengaged position in which it is shown in Figure 13. The plate W⁶ is carried by an upwardly projecting bracket plate W⁹ rigidly fixed on the main body of the machine, the plate W⁶ carrying two plungers W¹⁰ which slide in sockets on the plate W⁹ so that the plate W⁶ can only move towards and away from the main body of the machine in a direction parallel to the axis of the shaft W. The plate W⁶ is normally maintained in the position shown by a spring W¹¹ but can be drawn towards the machine to cause engagement of the clutch by a flexible control wire W¹², for example, of the Bowden type.

It is necessary, in order that the work may be removed from the work frame, for the machine needle to be in its uppermost position clear of the rectangular slot in the clamping plate of the frame. Accordingly the sewing machine in any of the arrangements described above may be provided with means whereby when the machine is stopped, the needle is raised automatically to a position in which it is clear of the work, such means preferably being operated by fluid pressure in the manner described in the specification of United Kingdom Patent No. 497,893 in the name of the present applicant although an electrical or Bowden wire control of any suitable type may be provided if desired.

In order to provide the unifying control referred to above, the single pedal actuated by the operator is arranged to operate simultaneously the control cables C¹¹ and W¹², the device for ensuring that the machine stops with the needle raised and also a switch for controlling the supply of current to the motor L⁸ for the pinion K. These several control elements are arranged so that with the pedal in its normal inoperative position the control cable C¹¹ is tensioned and thus the clamping plate C⁹ is raised from the base plate C⁸ so that the work can be inserted in or removed from the frame. The cable W¹² is however released so that the drive clutch is inoperative whilst the switch of the motor L⁵ is also open. The sequence of operations when the pedal is depressed comprises release of the cable C¹¹ to cause clamping of the work in the frame, release of the raising device for the machine needle, tensioning of the cable W¹² to engage the clutch and thus start operation of the machine and finally closing of the switch for the motor L⁵ so that the pinion K starts to rotate. If desired, the pedal may also be arranged to cause starting of the machine driving motor during the initial part of its movement. The desired design or character or series of characters is then reproduced on the work as described above in connection with the machines shown in Figures 1 to 6.

At the end of the reproducing operation, the release of the pedal causes the series of control operations described above to take place in the reverse way and with the reverse sequence. If desired, any other convenient control means can be provided such, for example, as a relay or solenoid controlled by a suitable switch or push button which may replace the pedal described.

If desired, the control rod carrying the pinion K may be arranged to actuate a switch when it reaches the end of a design or series of characters to be reproduced, such switch when operated, serving to bring the apparatus to rest.

As will be appreciated, the arrangement of the links and the form of the connections between the various members of the pantograph mechanism shown in Figures 11 and 12 may be varied as desired. Thus for example, the clamping frame for the work and the manner in which it is mounted and attached to the pantograph mechanism may be modified as shown in perspective in Figure 14. In this modified arrangement the lower plate $C^3$ of the clamping frame is fixed to the upper end of a vertical pillar $U^3$ having at its lower end a roller castor $U^5$ resting on the platform $B^3$. The pillar $U^8$ passes through a sleeve $U^6$ fixed between two plates $U^7$ which are mounted one on each side of the plate $U^1$ of the pantograph mechanism and are attached to the outer ends of the pivot pins connecting the links $E^9$ and $E^{10}$ to the plate $U^1$. The pillar $U^8$ thus moves horizontally with the plate $U^1$ and the clamping frame moves as in the arrangement shown in Figures 11 and 12. The castor $U^5$ at the lower end of the pillar $U^8$ provides direct support for the clamping frame. In addition, the clamping frame may be steadied, without restricting its free movement as controlled by the pantograph mechanism, by means of a link $X$ having one end pivoted to the back of the lower plate $C^3$ and the other end pivoted to another link $X^1$ which is in turn pivoted to a vertical pillar $X^2$ having its lower end fixed to the platform $B^3$.

The improved marking apparatus according to the invention is particularly suitable for use for laundry or other marking in large institutions, such as hospitals or hotels, where it is desired always to mark the same name or legend on a large number of different articles. Thus a rack having the outline of the name of the institution, for example in script writing or the outline of an appropriate signature, can be mounted on a single rectangular plate either with a groove on each side of the rack or with an "underlining" rack along which the pinion will return to the beginning so as to retrace the word or words. The machine as supplied to such institutions can then be simplified by the omission of the apparatus shown in Figure 7 for selecting the desired characters. It will be appreciated that any desired design other than a combination of letters or characters can be produced in the form of a rack for embroidery or analogous purposes. Thus, for example, if it is desired to produce a repeat design along the edge of an article, the outline of the design can be arranged in the form of a rack on a plate of suitable size so that it can be traced over by the pinion one or more times and then the work moved to repeat the design in the next adjacent position. The arrangement may be such that after the outline has been traced one or any desired number of times, the machine is stopped automatically to enable the work to be fed forward either by hand or automatically. Instead of the control arrangement for the clamping plate which is described above, the clamping device for the work may be controlled by fluid pressure in the manner described in the specification of United Kingdom Patent No. 497,894 in the name of the present applicant.

When desired, the machine can be used for darning, in which case the rack "design" over which the pinion moves is in the form of a series of closely spaced parallel lines joined at their ends so as to provide a continuous rack extending from one corner of a square or rectangular area to the opposite corner. As the pinion moves over this rack a series of parallel lines of stitches are sewn in the work. In order to complete the darn, the plate on which the rack is mounted is turned through 90°, or is replaced by another plate having the lines of the rack at right angles to those of the first plate, and the machine set in operation again to sew on the work a series of lines at right angles to and superimposed on the first series of lines thereby producing the finished darn. Any required form and shape of darn can be produced by suitable selection of the form of the rack and its overall shape.

If desired, instead of the work being clamped on the frame moved by the pantograph mechanism, this frame may carry the sewing machine whilst the work is held by a stationary clamp mounted on the work table or on a frame or other convenient support to which the pantograph mechanism is also fixed. In such an arrangement a relatively light sewing machine can be used instead of a heavy machine, such as is shown in Figure 2, of the shape and size normally used for general purposes. Owing to its rigidity the construction shown in Figure 8 or in Figures 11 and 12, is particularly suitable when the machine is to be movable and the work stationary but the construction shown in Figures 1 to 3 can also be used in this manner if desired.

It will be appreciated that the above description is by way of example only and that various modifications may be made within the scope of the invention. Thus, for example, the pantograph may be connected to the work frames of a number of sewing machines so that the same design or character is reproduced simultaneously in the articles associated with the several machines, this being readily possible owing to relatively large amount of power available at the control arm due to the positive drive between the pinion and the rack.

Furthermore, it is to be understood that whilst the invention has been described mainly as applied to machines for marking laundry or for embroidery, it can be employed for a variety of purposes where it is desired to traverse automatically the outline of a design or character which it is desired to reproduce. For example, the machine can be used for controlling the illumination of a bank of lamps constituting an electric sign on which a design or legend can be displayed by lighting the appropriate lamps in which case the work table of the arrangements described above is replaced by electric contact selector apparatus which moves to complete the circuits of the appropriate lamps (or relay devices controlling such lamps) as the end of the control arm travels around the outline of the design or legend to be displayed, the pantograph mechanism being, if desired, such that the movements of the pinion are magnified and not reduced as in the arrangements described above.

Further applications of the improved reproducing apparatus according to this invention comprise guiding the cutting tools of machine tools, engraving machines or acetylene or electric cutting apparatus so as to reproduce a desired pattern, design or character or an article having a predetermined shape or profile.

What I claim and desire to secure by Letters Patent of the United States is:

1. In apparatus for reproducing characters, designs or the like, the combination of a base plate, a toothed rack with upwardly projecting teeth carried by the base plate and shaped to the character to be reproduced, a movable control rod disposed above and movable in a plane parallel to the base plate, a downwardly projecting spindle carried by the control rod and having its lower end engaging in a slot in the base plate adjacent to the rack, means for rotating the spindle, a pinion carried on and rotated by the spindle, the said pinion engaging the rack, a reproducing device, and means for connecting the control rod to the reproducing device so that movements representative of the course followed by the pinion are imparted to the reproducing device.

2. In apparatus for reproducing characters, designs or the like, the combination of a base plate, a toothed rack with upwardly projecting teeth carried by the base plate, the said rack having the shape to be reproduced and lying between guide slots in the base plate which extend around the ends of the rack, a pinion engaging the rack, means for rotating the pinion, a movable control rod carrying the pinion, a member carried by the control rod for engaging in the slots whereby the pinion, as it rotates, moves around the rack, a reproducing device and a pantograph link system for connecting the control rod to the reproducing device.

3. In apparatus for reproducing characters, designs or the like, the combination of a toothed rack having the shape to be reproduced, a rotatable pinion engaging the rack, a movable control rod carrying the pinion, a driving shaft passing through a bore in the control rod for rotating the pinion, co-operating guide means associated with the rack and the pinion whereby as the pinion rotates it moves over the rack in a course determined by the shape of the rack and thereby causes corresponding movement of the control rod, a reproducing device, means for connecting the control rod to the reproducing device so that movements representative of the course followed by the pinion are imparted to the reproducing device and an electric motor carried by the said connecting means for rotating the driving shaft.

4. In apparatus for reproducing characters, designs or the like, the combination of a base plate, a toothed rack with upwardly projecting teeth carried by the base plate and shaped to the character to be reproduced, a movable control rod disposed above and movable in a plane parallel to the base plate, a downwardly projecting spindle having its lower end engaging in a slot in the base plate adjacent to the rack, a pinion carried on and rotated by the spindle, the said pinion engaging the rack, a driving shaft passing through a bore in the control rod for rotating the spindle, a reproducing device, a pantograph link system of which the control rod forms a part for connecting the control rod to the reproducing device, and an electric motor carried by the pantograph link system for rotating the said driving shaft.

5. In apparatus for producing a sewn laundry mark or for embroidery, the combination of a toothed rack shaped to the character or design to be reproduced, a pinion engaging the rack, means for rotating the pinion, a movable control rod carrying the pinion, co-operating guide means associated with the rack and the pinion whereby as the pinion rotates it moves over the rack in a course determined by the shape of the rack and thereby causes corresponding movement of the control rod, a fixed reciprocating needle sewing machine, a clamping frame for an article to be marked or embroidered, the said frame being movable below the needle of the sewing machine, and a pantograph link system connecting the control rod to the clamping frame.

6. In apparatus for reproducing characters, designs or the like, the combination of a toothed rack shaped to the character or design to be reproduced, a pinion engaging the rack, means for rotating the pinion, a movable control rod carrying the pinion, co-operating guide means associated with the rack and the pinion whereby as the pinion rotates it moves over the rack in a course determined by the shape of the rack and thereby causes corresponding movement of the control rod, a reproducing device and a pantograph link system for connecting the control rod to the reproducing device, the said pantograph link system comprising at least two members each consisting of a pair of parallel links, and coupling elements for so connecting the said members that the links of a pair remain parallel to one another during movement of the said system.

7. In apparatus for producing a sewn laundry mark or for embroidery, the combination of a toothed rack shaped to the character or design to be reproduced, a pinion engaging the rack, means for rotating the pinion, a movable control rod carrying the pinion, co-operating guide means associated with the rack and the pinion whereby as the pinion rotates it moves over the rack in a course determined by the shape of the rack and thereby causes corresponding movement of the control rod, a fixed reciprocating needle sewing machine, a clamping frame for an article to be marked or embroidered, the said frame being movable below the needle of the sewing machine, and a pantograph link system connecting the control rod to the clamping frame, the said pantograph link system comprising a fixed pivot, a main arm mounted on the pivot and also pivoted to the control rod, a coupling element pivoted to the clamping frame, a pair of parallel links pivotally connecting the coupling element to the main arm, a second pair of parallel links pivotally connecting the coupling element to the control rod, a second fixed pivot, a second coupling element and two further pairs of parallel links respectively pivotally connecting the second coupling element to the second fixed pivot and to the control rod, the arrangement of the several pairs of parallel links and the coupling elements being such that the links of each pair remain parallel to one another during movement of the said pantograph link system.

8. Apparatus for producing a sewn laundry mark or for embroidery comprising, in combination, a work table, a reciprocating needle sewing machine, a clamping frame for an article to be marked or embroidered movably mounted beneath the needle of the sewing machine, a plate supported on the work table, a toothed rack with upwardly projecting teeth carried by the plate, the said rack having the shape of the mark or embroidery to be produced, a horizontal supporting platform rigidly fixed below the work table, a fixed vertical pivot carried by the platform, a main arm having one end mounted on the pivot, a pivot pin at the other end of the main arm, the said pivot pin projecting upwardly through an opening in the work table, a castor on the lower end of the said pivot pin and engaging the supporting platform, a control rod having one end pivoted on the upper end of the said pivot pin so that the rod can swing about the pin in a plane above and parallel to the work table, a downwardly projecting rotatable spindle at the other end of the control rod, the said spindle having its lower end engaging in a guide slot formed in the plate adjacent to the rack, a pinion on the spindle for engaging the rack, means for rotating the said spindle, a movable disc disposed below the work table and supporting the clamping frame, a pivot for the disc, a castor at the lower end of the said pivot and engaging the said platform, a pivot pin passing through a bore in the said main arm at a part thereof intermediate the ends, a pair of parallel links pivotally connecting the movable disc and the pivot pin passing through the arm, a pivot pin extending downwardly through an opening in the work table from a part of the control arm intermediate the ends, a disc on said pivot pin, a pair of parallel links pivotally connecting the movable disc supporting the clamping frame and the disc on the said pivot pin connected to an intermediate part of the control rod, and means for ensuring that during movement of the clamping frame as the pinion traverses the rack, the two links of each pair are maintained parallel to one another.

9. Apparatus for producing a sewn laundry mark or for embroidery comprising, in combination, a work table, a reciprocating needle sewing machine, a clamping frame for an article to be marked or embroidered movably mounted beneath the needle of the sewing machine, a plate supported on the work table, a toothed rack with upwardly projecting teeth carried by the plate, the said rack having the shape of the mark or embroidery to be produced, a movable supporting platform pivoted at one end below the work table, an arm pivoted at one end to a part of the said platform intermediate the ends and at the other end to the clamping frame, a pivot pin projecting upwardly from the end of the said platform remote from the pivot through an opening in the work table, a control rod having one end pivoted on the upper end of the said pivot pin so that the rod can swing about the pin in a plane above and parallel to the work table, a downwardly projecting rotatable spindle at the other end of the control rod, the said spindle having its lower end engaging in a guide slot formed in the plate adjacent to the rack, a pinion on the spindle for engaging the rack, means for rotating the said spindle, a member projecting downwardly from a part of the said control rod intermediate its ends through an opening in the work table, and a link connecting the lower end of said member to the arm supporting the clamping frame.

10. In apparatus for reproducing characters, designs or the like, the combination of a work table, a series of plates arranged below the work table, means for moving the plates to expose a selected plate at the top of the table, a toothed rack having an outline of a character to be reproduced on each plate, a pinion for engaging the rack of the plate exposed at the top of the table, means for rotating the pinion, a pivoted control rod carrying the pinion and movable in a plane above and parallel to the top of the table, co-operating guide means associated with the rack and the pinion whereby as the pinion rotates it moves over the rack in a course determined by the shape of the rack and thereby causes corresponding movement of the control rod, a reproducing device on the work table, and means for connecting the control rod to the reproducing device so that movements representative of the course followed by the pinion are imparted to the reproducing device.

11. In apparatus for reproducing characters, the combination of a work table, a series of plates arranged side by side on the work table, a toothed rack on each plate shaped to a character to be reproduced, end portions of the rack on each plate which co-operate with corresponding portions of the racks on adjacent plates to form a continuous rack extending from end to end of the several plates, a pinion engaging the rack, means for rotating the pinion, a movable control rod carrying the pinion, a member carried by the control rod for engaging in a guide slot adjacent to the rack on each plate whereby the pinion, when it rotates, can move from end to end of the continuous rack on the several plates without manual manipulation, a reproducing device on the work table and means for connecting the control rod to the reproducing device so that movements representative of the course followed by the pinion are imparted to the reproducing device.

12. In combination with the reproducing apparatus claimed in claim 5, means for driving the sewing machine, a clutch for connecting the driving means to the sewing machine and a control device for the clutch.

13. In combination with the reproducing apparatus claimed in claim 5, means for operating the clamping frame, means for stopping the sewing machine with its needle raised above the clamping frame, means for driving the sewing machine, a clutch for connecting the sewing machine to the driving means, and a single control device for causing operation of the clamping frame, the machine stopping means, the clutch, and the means for rotating the pinion whereby these several means are operative in the appropriate sequence during starting and stopping of the apparatus.

14. Apparatus for marking laundry articles comprising a reciprocating needle sewing machine, a movable clamping frame for the article to be marked disposed below the reciprocating needle of the machine, a pivoted horizontal control rod, a rotatable pinion at the free end of the control rod, a pantograph link mechanism connecting the clamping frame to the control rod whereby horizontal movements of the free end of the control rod produce corresponding movements of the clamping frame, means for positively driving the rotatable pinion and at least one character having an outline corresponding to the required marking and consisting of a rack which co-operates with the rotating pinion in such a manner that the free end of the control rod moves horizontally and automatically over a course corresponding to the desired outline.

FREDERICK GEORGE TILLETT.